(12) United States Patent
Haberer et al.

(10) Patent No.: US 9,241,043 B2
(45) Date of Patent: Jan. 19, 2016

(54) METHOD OF CONNECTING A HARDWARE MODULE TO A FIELDBUS

(71) Applicant: SICK AG, Waldkirch/Breisgau (DE)

(72) Inventors: Manfred Haberer, Riegel (DE); Ralph Rapp, Endingen (DE); Christoph Angenendt, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 153 days.

(21) Appl. No.: 14/097,326

(22) Filed: Dec. 5, 2013

(65) Prior Publication Data

US 2014/0164550 A1 Jun. 12, 2014

(30) Foreign Application Priority Data

Dec. 6, 2012 (EP) .................................... 12195850

(51) Int. Cl.
*H04L 29/08* (2006.01)
*H04L 12/40* (2006.01)
*G06F 9/44* (2006.01)

(52) U.S. Cl.
CPC .......... *H04L 67/2842* (2013.01); *G06F 9/4415* (2013.01); *H04L 12/40032* (2013.01); *H04L 12/40169* (2013.01)

(58) Field of Classification Search
CPC .................................................. H04L 67/2842
USPC .............................. 709/213, 216; 710/11, 104
See application file for complete search history.

(56) References Cited

U.S. PATENT DOCUMENTS

| | | | |
|---|---|---|---|
| 6,564,268 B1 * | 5/2003 | Davis ................. | G05B 19/4185 379/229 |
| 2003/0217255 A1 | 11/2003 | Wyatt | |
| 2006/0195832 A1 | 8/2006 | Chandley et al. | |
| 2006/0229737 A1 * | 10/2006 | Esch et al. ........................ | 700/1 |
| 2008/0313254 A1 * | 12/2008 | Hilemon ............ | G05B 19/4185 709/200 |
| 2011/0098830 A1 * | 4/2011 | Weddingfeld et al. .......... | 700/79 |
| 2013/0053987 A1 * | 2/2013 | Galt et al. ....................... | 700/12 |

FOREIGN PATENT DOCUMENTS

EP          1533770 B1          5/2005

OTHER PUBLICATIONS

"FOUNDATION™ Fieldbus Interface Software (for the ROC800-Series) User Manual"—Emerson Process Management, Nov. 2009 http://www.documentation.emersonprocess.com/groups/public/documents/instruction_manuals/d301653x012.pdf.*
European Search Report dated Mar. 22, 2013, relating to EP 12 195 850.8 with English Translation.

* cited by examiner

*Primary Examiner* — Randy Scott
(74) *Attorney, Agent, or Firm* — Nath, Goldberg & Meyer; Jerald L. Meyer; Stanley N. Protigal

(57) ABSTRACT

A method is described of connecting a hardware module to a fieldbus, wherein a data connection between the hardware module and the fieldbus is established by a network module which is connected to the fieldbus and which has an internal memory, said method comprising the steps that the hardware module is connected to the network module, that the communication software is read out of the memory of the network module by the hardware module, said software being provided for the communication of the hardware module with the fieldbus, that the communication software is stored in the hardware module, and that the hardware module is use to communicate over the fieldbus.

14 Claims, 2 Drawing Sheets

METHOD OF CONNECTING A HARDWARE MODULE TO A FIELDBUS

Figure 1:
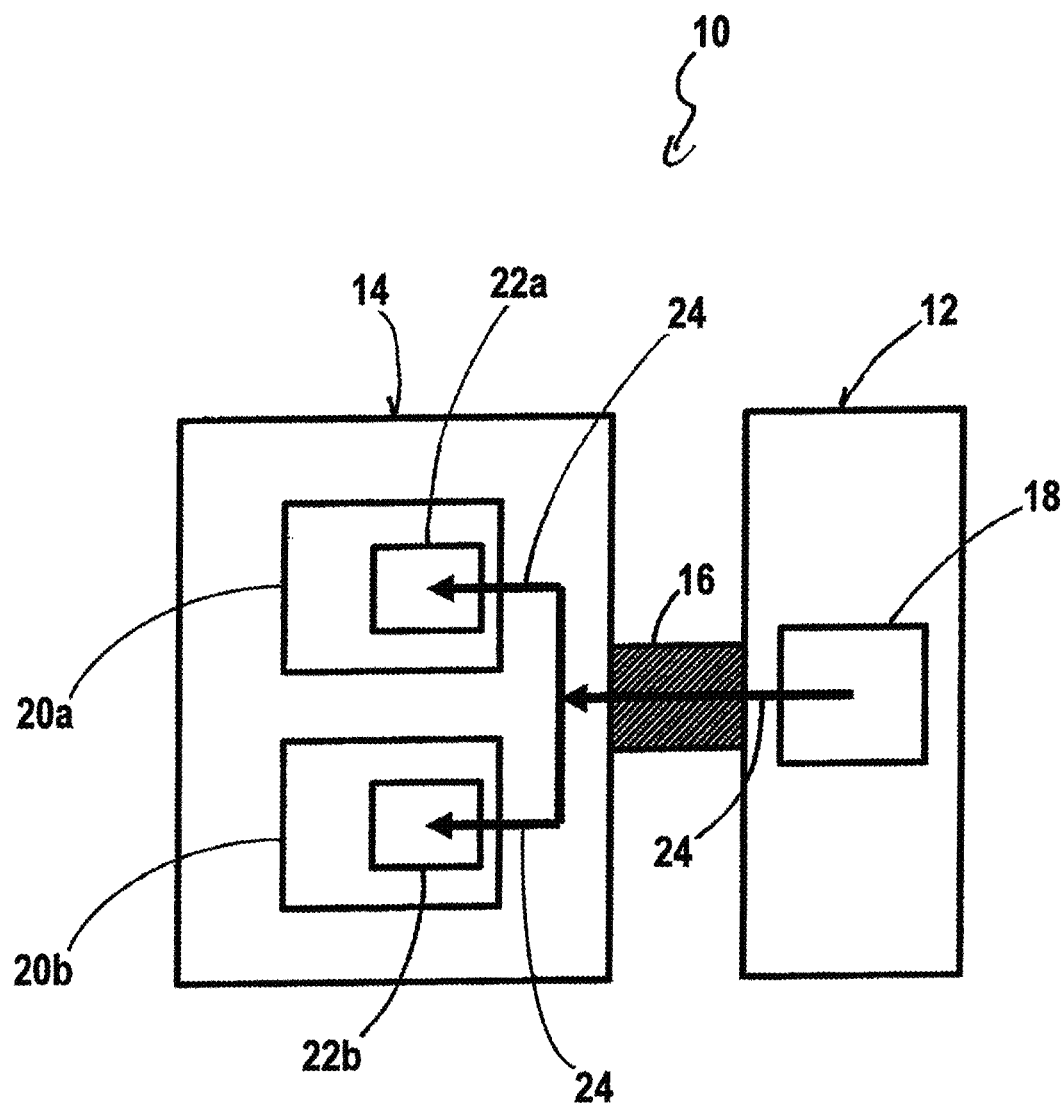

The present invention relates to a method of connecting a hardware module to a fieldbus, wherein a data connection is established between the hardware module and the fieldbus by a network module which is connected to the fieldbus and which has an internal memory. The hardware module is coupled to the network module for this purpose, with communication of the hardware module over the fieldbus being made possible by the network module.

Fieldbuses are in particular used in industrial automation and allow data communication, for example of sensors and actuators, with a central control system. Due to the many different known fieldbus systems (for example CAN, Ether-CAT, ProfiNET or Profibus) and to the different communication protocols associated with them, sensors or actuators which are to be connected to the fieldbus each have to be specifically matched to the fieldbus used. The variety of variants in the production of sensors and actuators is thus increased, which results in increased costs for development, production and storage.

In particular in safety-relevant applications for which safe fieldbuses (for example ProfiNET Safe or Safe EtherCAT) are used, the device software and the software which serves for the communication over the fieldbus (the so-called network stack) always has to be subjected to a complete verification and/or a technical safety qualification and acceptance. The verification and qualification is in this respect to be carried out for every type of fieldbus used and is associated with corresponding costs and effort.

It is thus the underlying object of the invention to provide a method of connecting a hardware module to a fieldbus which reduces the effort in adapting the hardware module to fieldbus systems.

In accordance with the invention, this object is satisfied by a method in accordance with claim 1 and in particular in that communication software which is provided for the communication of the hardware module with the fieldbus is read out of the memory of the network module by the hardware module. The communication software is subsequently stored in the hardware module, with the hardware module using the communication software to communicate over the fieldbus.

The communication software (that is the network stack) advantageously does not have to be present in the hardware module in advance, whereby the hardware module would be restricted to communication with a specific type of fieldbus. Instead, the hardware module receives the communication software from the network module. The communication software is for this purpose transferred from the network module to the hardware module, with the hardware module being put into position by the communication software to be able to communicate over the fieldbus.

In this respect, any device which is provided for connection to and for communication over a fieldbus is to be understood as a hardware module. For example, hardware modules can be formed by electrical or pneumatic actuators as well as by sensors such as laser scanners, for example.

The hardware module can thus be developed and produced completely independently of a used fieldbus system since the adaptation to a respective fieldbus system only takes place by the coupling of the hardware module to the network module. The hardware module can consequently be developed, verified and qualified in only one variant, whereby the costs of development, production and storage are reduced.

In addition, a flexible use of hardware modules in different fieldbus systems is possible in that the hardware module is disconnected from the network module and is coupled to a new network module of a second fieldbus. After the coupling to the new network module, new communication software is read out of the memory of the new network module and replaces the previous communication software in the hardware module. The hardware module is thereby able to communicate over the second fieldbus. Existing hardware modules can also be connected to future, still unknown fieldbus systems due to the method in accordance with the invention in that network modules are coupled to the hardware modules in which communication software for the future fieldbus systems is stored. In accordance with the invention, hardware modules can thus also continue to be used after further developments of fieldbuses and do not have to be replaced by updated hardware modules.

It is equally advantageous that the network modules used in the method in accordance with the invention do not have to be specifically adapted to the hardware modules, that is a specific type of network module can in principle be coupled to any type of hardware module to allow the hardware module to communicate over a specific fieldbus. The network module can thus be developed and produced independently of the hardware modules. Consequently, high volumes can result for the network modules, whereby the costs for individual network modules can be reduced.

Advantageous embodiments of the invention are described in the description, in the Figures and in the dependent claims.

In accordance with a first advantageous embodiment, the read out communication software is adapted to the fieldbus with which the network module establishes a data connection. Communication software for two or more different fieldbus systems is advantageously stored in the memory of the network module. The network module can therefore serve for the connection of the hardware module to different fieldbus systems. Depending on which fieldbus system the network module is currently connected to, the respective matching communication software is provided to the hardware module.

In accordance with a further advantageous embodiment, the hardware module has a two-channel processor, in particular a microprocessor, or at least two redundant processors. The communication software is in this respect redundantly stored in each channel or in each processor and is processed by each channel or by each processor. A two-channel design can in this respect in particular be required with safety-critical applications to provide a fail-safe hardware and software architecture. On a failure of a channel or of a processor, the second channel or the second processor takes over the work of the defective channel. The method in accordance with the invention can thus be used, for example, for safe sensors such as for safe laser scanners, for example.

In accordance with a further advantageous embodiment, the network module is also mechanically releasable from the hardware module again.

The network module and the hardware module can thus be manufactured separately from one another and can, for example, be replaced independently of one another in the event of a failure, whereby smaller repair costs can result. In addition, in this manner, both the network module and the hardware module can each be coupled with any desired other hardware modules and network modules. A use of a hardware module with an alternative fieldbus system is thus possible at any time. The network module and the hardware module are in particular arranged in separate housings.

In accordance with a further advantageous embodiment, the hardware module is a sensor module, in particular a safe sensor module. The hardware module can thus serve to detect measured data, with the sensor module in particular being able to be configured for safety-critical applications.

In accordance with a further advantageous embodiment, the hardware module is a laser scanner, in particular a safe laser scanner. A protected zone can thus, for example, be monitored by means of laser light using the hardware module designed as a laser scanner and an alarm can be output via the fieldbus when a person is located in the protected zone.

In accordance with a further advantageous embodiment, the fieldbus is an Ethernet-based fieldbus, in particular of the type ProfiNet Safe or Safe EtherCAT. Ethernet-based fieldbuses are widespread, with an embodiment as a safe fieldbus of the type ProfiNET Safe or Safe EtherCAT in particular being sensible when the hardware module is also present in a safe design, for example as a safe laser scanner.

With safety-critical applications, the usually required arrangement of a redundant processor in the network module can advantageously be dispensed with due to the method in accordance with the invention since the communication software is already redundantly processed in the hardware module. A redundancy in the network module is thus no longer necessary.

The invention furthermore comprises a network module which serves for integrating a hardware module into a fieldbus, wherein the network module has an internal memory in which communication software is stored which allows the hardware module to communicate over the fieldbus. The network module furthermore comprises an interface for the hardware module which is configured to transfer communication software from the internal memory to the hardware module. The network module in accordance with the invention thus allows a hardware module to communicate over the fieldbus in that the network module provides the hardware module at the interface with the communication software which can be transferred to the hardware module.

In accordance with an advantageous embodiment, the internal memory is a non-volatile memory. The communication software can consequently remain stored in the network module even if the network module has no energy supply or voltage supply.

The invention equally comprises a hardware module for connecting to a fieldbus and having a processor. The hardware module in accordance with the invention is characterized in that the processor is designed to access communication software, in particular from a network module, which software allows a communication of the hardware module over the fieldbus and to use it for communication over the fieldbus. The hardware module can thus communicate over different fieldbus systems by means of different communication software.

In accordance with an advantageous embodiment, the processor comprises a two-channel processor. An additional redundant processor is alternatively provided. The failure safety of the hardware module, which can then also be operated as a safe hardware module, is increased in this manner.

The invention further comprises a modular system comprising at least one hardware module which communicates with a fieldbus over a network module, wherein the hardware module and the network module are configured to transfer communication software from the network module to the hardware module, the software allowing the hardware module to communicate over the fieldbus.

Figure 2:
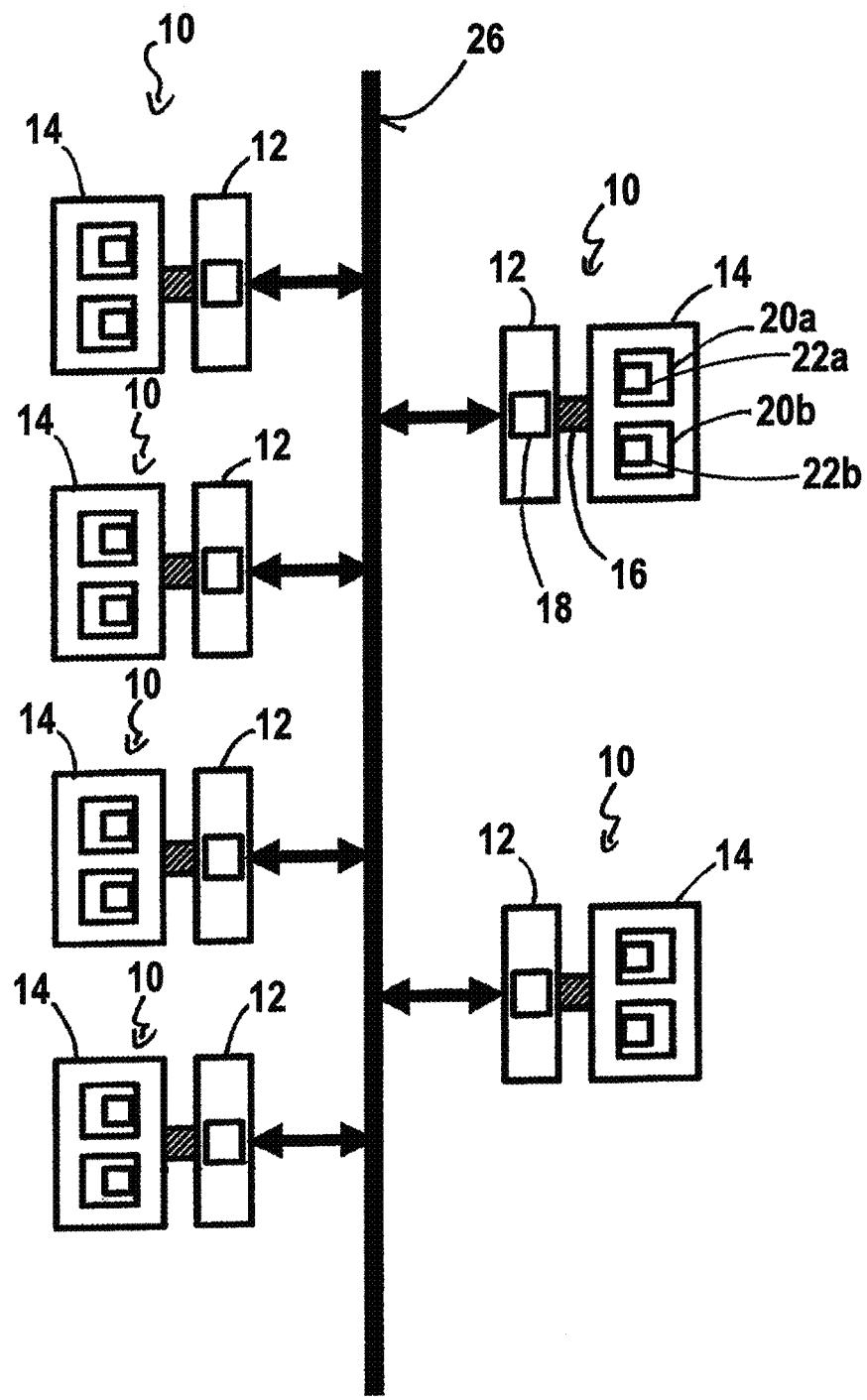

The invention will be described in the following purely by way of example with reference to a possible embodiment and to the enclosed drawings. There are shown:

FIG. 1 a schematic representation of a modular system in accordance with the invention comprising a hardware module and a network module; and FIG. 2 a fieldbus system with a plurality of connected modular systems in accordance with the invention.

FIG. 1 schematically shows a modular system 10 which comprises a network module 12 as well as a hardware module 14. The network module 12 comprises an interface 16 which establishes a data connection between the network module 12 and the hardware module 14.

The network module 12 furthermore comprises a non-volatile internal memory 18 as well as a second interface (not shown) for connection to a fieldbus 26 (FIG. 2).

The hardware module 14 has two redundant processors 20a, 20b which each comprise a memory region 22a, 22b in which communication software can be stored.

The hardware module 14 can comprise a safe laser scanner, for example, with here only those components of the hardware module being shown which are involved in the communication with the fieldbus 26. The processors 20a and 20b are connected in a manner known per se to the other components of the hardware scanner (that is, for example, a safe laser scanner), which are not shown for reasons of clarity, for their control and reading out.

If the hardware module 14 is now to be connected to a fieldbus 26, the hardware module 14 is coupled to the network module 12 via the interface 16. The network module 12 and the hardware module 14 are advantageously arranged in two separate housings (not shown). A coupling therefore first takes place mechanically, for example by plugging the separate housings together using a plug-in connection. The network module 12 is in this respect connected to the fieldbus 26 (cf. FIG. 2).

After the coupling and the switching on of the network module 12 and the hardware module 14, the network module 12 initially checks which type of fieldbus 26 it is connected to at its second interface. If the network module 12, for example, determines that the connected fieldbus 26 is a fieldbus of the type ProfiNET Safe, communication software is selected in the memory 18 which puts the hardware module 14 in a position to communicate over the fieldbus ProfiNET Safe. The communication software for communication over Profi-NET Safe is then transferred FROM the memory 18 via the interface 16 to the hardware module 14 and is stored in each case in the memory regions 22a, 22b in the hardware module 14. An identical copy of the communication software is then present in each memory region 22a, 22b after the storing. Such a copying process 24 is represented by arrows in FIG. 1.

Once the transmission of the communication software into the memory regions 22a, 22b is terminated, the hardware module 14 can use the communication software (that is the network stack) to communicate with the fieldbus 26 via the network module 12. For this purpose, the hardware module 14 integrates the communication software into its program code and carries it out using the processors 20a, 20b.

FIG. 2 shows by way of example a topology of the fieldbus 26 to which a total of six modular systems 10 are connected. Such a topology can be present, for example, in industrial plant or in production lines in which different protected zones are monitored by independent laser scanners.

Each modular system 10 is in this respect connected to the fieldbus 26 by a network module 12. The hardware modules 14, which comprise laser scanners here, for example, can thus communicate with each other and with a controller (not shown) via the fieldbus 26. The controller can take over the process control of the industrial plant, for example.

In all modular systems 10 connected to the fieldbus 26, a check is also made after the initial transfer of the communication software from the memory 18 into the memory regions 22a, 22b of the hardware module 14 on every switching on of a modular system as to whether the communication software stored in the memory regions 22a, 22b can be used with the fieldbus 26 connected to the network module 12, that is here, for example, whether the communication software is suitable for use with a ProfiNET Safe bus. If this is not the case, communication software compatible with the ProfiNET Safe bus is copied from the memory 18 via the interface 16 into the memory regions 22a, 22b of the processors 20a, 20b. In this manner, smooth communication of the modular systems 10 with the fieldbus 26 is ensured both on a replacement of a hardware module 14 and on a change to the fieldbus 26.

REFERENCE NUMERAL LIST 10 modular system
12 network module
14 hardware module
16 interface
18 memory
20a, 20b processor
22a, 22b memory region
24 copying process
26 fieldbus

The invention claimed is:

1. A method of connecting a hardware module (14) to a fieldbus (26), wherein a data connection between the hardware module (14) and the fieldbus (26) is established by a network module (12) which is connected to the fieldbus (26) and which has an internal memory (18), said method comprising the steps of:
   coupling the hardware module (14) to the network module (12);
   reading out communication software from the memory (18) of the network module (12) by means of the hardware module (14) and said communication software being provided for the communication of the hardware module (14) with the fieldbus (26),
      wherein the communication software read out from the memory is adapted to the fieldbus (26) with which the network module (12) establishes a data connection, and
      wherein the communication software for at least two different fieldbus systems is stored in the memory (18) of the network module (12);
   storing the communication software in the hardware module (14); and
   using the communication software in the hardware module (14) to communicate over the fieldbus (26).

2. The method in accordance with claim 1, wherein the hardware module (14) has a two-channel processor (20); and
   wherein the communication software is stored redundantly in each channel and is processed by each channel.

3. The method in accordance with claim 2, wherein the hardware module (14) has a two-channel microprocessor.

4. The method in accordance with claim 1, wherein the hardware module (14) has at least two redundant processors (20a, 20b); and
   wherein the communication software is stored redundantly in each processor (20) and is processed by each processor (20).

5. The method in accordance with claim 1, wherein the network module (12) is mechanically releasable from the hardware module (14).

6. The method in accordance with claim 1, wherein the hardware module is a sensor module (14).

7. The method in accordance with claim 6, wherein the hardware module is a safe sensor module (14).

8. The method in accordance with claim 1, wherein the hardware module (14) is a laser scanner.

9. The method in accordance with claim 8, wherein the hardware module (14) is a safe laser scanner.

10. The method in accordance with claim 1, wherein the fieldbus (26) is an Ethernet-based fieldbus (26).

11. The method in accordance with 10, wherein the Ethernet-based fieldbus (26) is of the type ProfiNET Safe or of the type Safe EtherCAT.

12. A network module (12) for integrating a hardware module (14) into a fieldbus (26), comprising:
   an internal memory (18) in which communication software is stored which allows the hardware module (14) to communicate over the fieldbus (26); and
   an interface (16) for the hardware module (14) which is configured to transfer communication software from the internal memory (18) to the hardware module (14),
      wherein the communication software read out from the memory is adapted to the fieldbus (26) with which the network module (12) establishes a data connection, and
      wherein communication software for at least two different fieldbus systems is stored in the memory (18) of the network module (12).

13. The network module (12) in accordance with claim 12, wherein the internal memory (18) is a non-volatile memory (18).

14. A modular system (10) comprising at least one hardware module (14) which communicates with a fieldbus (26) over a network module (12),
   wherein the hardware module (14) and the network module (12) are configured to transfer communication software from the network module (12) to the hardware module (14), said software allowing the hardware module (14) to communicate over the fieldbus (26), and
   wherein communication software for at least two different fieldbus systems is stored in a memory (18) of the network module (12).

* * * * *